UNITED STATES PATENT OFFICE.

WERNER VON BOLTON, OF CHARLOTTENBURG, GERMANY, ASSIGNOR TO SIEMENS & HALSKE AKTIENGESELLSCHAFT, OF BERLIN, GERMANY.

PROCESS OF MAKING HOMOGENEOUS BODIES FROM TANTALUM METAL OR OTHER REFRACTORY METALS.

No. 904,831.     Specification of Letters Patent.     Patented Nov. 24, 1908.

Application filed January 5, 1904. Serial No. 187,830.

*To all whom it may concern:*

Be it known that I, WERNER VON BOLTON, chemist, residing at Charlottenburg, near Berlin, Germany, 10 Lützow, have invented a new and useful Process of Making Homogeneous Bodies from Tantalum Metal or other Refractory Metals, of which the following is a full, clear, concise, and exact description.

In the treatment of refractory metals, especially metals of the tantalum group, uncommon difficulties are met with, if perfectly homogeneous bodies are to be made therefrom. The drawing of said metals especially is rendered highly difficult, if we do not start with a quite homogeneous metallic material which can be obtained exclusively by a thorough melting process. However, the melting of such a metal constitutes a very difficult task, as the metal at the high melting temperatures is liable to enter into chemical combinations with the materials of its surroundings. On the other hand, it is by no means easy to obtain suitable crucibles capable of withstanding the high temperatures utilized in the melting process.

Highly refractory materials, such, for instance, as tantalum and zirconium, or metals of kindred groups can be obtained in various ways, but all processes known prior to the present time produce, as a result of their use, a metal in the form of a powder. Metals in powdered form, however, cannot be used for a majority of purposes and particularly for the purpose of making firmly coherent bodies, as it is necessary to fuse such bodies into a coherent or homogeneous mass. This melting or fusing is a comparatively simple process with easily melting or non-refractory metals, but in the production of metals like those here under consideration, which are very refractory, it has not been possible heretofore to produce homogeneous bodies; or, if it were possible to obtain such bodies they were mixed to a very great extent with non-metallic impurities, such as carbids, etc., and, therefore, were useless for technical purposes.

My invention has for its objects, first, to offer or present a process of melting or fusing metals which have a very high melting point and which at high temperatures easily undergo chemical alterations when in contact with other substances; and, second, to offer a process for melting metals of this nature into a homogeneous and pure metallic mass, and these results are effected through the agency of an electric current which is conveyed through a compressed or united mass of metallic powder of the metal to be treated. For the purpose of practicing this method the metal powder might be used immediately in the same state in which it is produced, but to do so would be very disadvantageous, for the reason that the loose powder of any metal offers an extremely variable resistance to an electric current. I, therefore, subject the powder of the metal to be treated to sufficient pressure to practically bind or unite it together or give to it a coherent or relatively solid mass and then pass a current of electricity through it, preferably while it is submerged in a rare atmosphere approximating a vacuum. For best effecting this the mass of compressed powder is secured between clamps of tantalum constituting the terminals of a source of electrical energy. The metal commences to fuse as soon as an electrical current of sufficient intensity is led through the compressed powder. The fusing process will generally proceed with relation to such compressed body of powder upon the principle that a small bar fuses at its thinnest point, or at the point of smallest cross section and hence highest resistance. An arc is therefore formed at the fusing point and in this arc the further parts of the bar melt down, so that more or less large beads of molten metal collect at the molten ends. These beads drop off as the fusing proceeds.

Instead of forming a small bar of compressed metal powder and fusing it in the manner described, it will be preferable in most cases to press the metal powder into small rods or similar bodies. These are placed on a plate of very refractory metal, for instance, of tantalum, which forms one electrode, the other electrode being then approached to this body of compressed metal powder until both come into contact with each other. Thereupon the other electrode is somewhat removed again, whereby an arc is formed in which the body of metal powder gradually melts. The molten body remains on the plate. It is also possible, of course, to place a crucible below the arc and allow the molten metal to go on dropping into it as the fusing proceeds.

If the molten metal is brought into contact during the fusing process with other substances with which it is very liable to combine chemically at high temperatures, the result will be a strongly impure product, and as almost all very refractory metals are most apt to chemically combine with other substances at the high temperatures here in question, it is extremely difficult to obtain a pure metal. Above all, no carbon must be used as an electrode for fusing the metal, as otherwise the metal would take up too much carbon and might, under circumstances, be changed into a carbid. Further, all oxygen must be kept away and, therefore, all air must be pumped out of the fusing vessel as far as possible. Tantalum metal and many others are also liable to chemically combine with nitrogen, hydrogen, etc., and, consequently, these injurious gases must also be kept away. Therefore, I prefer to execute the fusing process in a vacuum as perfect as can be obtained and to have the electrodes between which the fusing takes place out of the same metal as that which is to be fused.

I have found that it is best to use direct current for the fusing process and to bring the metal to be fused into contact with the positive electrode. This electrode may consist, for instance, of a small plate of the same metal as that which is to be fused. The negative electrode may consist of another metal, as it will not so easily be brought to fusing. If the negative electrode is large enough it can be formed of pretty easily fusible metals, such as silver, and will yet not combine with the molten product. Metallic bodies treated according to this process are quite homogeneous and have the highest degree of ductility which can be attained by the respective metals according to their chemical quality. Thus it is possible, without difficulty, to produce quite homogeneous bodies of tantalum metal. If pure raw material is used for the purpose and if all impurities are kept away during the fusing process, the tantalum metal so obtained will have such a high degree of ductility that it can be rolled into very fine sheets and drawn into the finest of wires, while formerly it was generally thought that pure tantalum metal was quite brittle and could in no way be worked mechanically.

Having thus described my invention what I claim and desire to secure by Letters Patent of the United States is—

1. A process of making homogeneous bodies from tantalum or other highly refractory metals which consists in first compressing a quantity of the powder of the metal into a coherent mass; then heating the same to the melting or fusing point through the agency of an electrical current and in an indifferent atmosphere.

2. A process of making homogeneous bodies from tantalum or other highly refractory metals which consists in uniting a powder of the metal into the form of a coherent mass; then heating said mass to the melting or fusing point by passing an electrical current through the same and simultaneously subjecting it to the action of a rare atmosphere.

In witness whereof, I hereunto subscribe my name this 18th day of December A. D., 1903.

WERNER V. BOLTON.

Witnesses:
HENRY HASPER,
WOLDEMAR HAUPT.